United States Patent
Malton et al.

(10) Patent No.: US 10,664,377 B2
(45) Date of Patent: May 26, 2020

(54) AUTOMATION OF SOFTWARE VERIFICATION

(71) Applicant: BlackBerry Limited, Waterloo (CA)

(72) Inventors: Andrew James Malton, Waterloo (CA); Daniel Lewis Neville, Basingstoke (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/649,189

(22) Filed: Jul. 13, 2017

(65) Prior Publication Data

US 2018/0018253 A1 Jan. 18, 2018

Related U.S. Application Data

(60) Provisional application No. 62/362,978, filed on Jul. 15, 2016.

(51) Int. Cl.
  *G06F 11/36* (2006.01)
(52) U.S. Cl.
  CPC ...... *G06F 11/3604* (2013.01); *G06F 11/3608* (2013.01); *G06F 11/3684* (2013.01)
(58) Field of Classification Search
  None
  See application file for complete search history.

(56) References Cited

U.S. PATENT DOCUMENTS

| | | | | |
|---|---|---|---|---|
| 6,226,776 | B1* | 5/2001 | Panchul | G06F 17/5045 716/102 |
| 6,360,356 | B1* | 3/2002 | Eng | G06F 17/5045 716/105 |
| 7,765,547 | B2* | 7/2010 | Cismas | G06F 9/3851 712/214 |
| 2004/0154019 | A1* | 8/2004 | Aamodt | G06F 9/3009 718/102 |
| 2005/0268269 | A1* | 12/2005 | Coiley | G06F 17/5031 716/113 |
| 2009/0276758 | A1* | 11/2009 | Song | G06F 8/456 717/124 |
| 2013/0042145 | A1* | 2/2013 | Pasupuleti | G06F 11/3676 714/32 |

(Continued)

OTHER PUBLICATIONS

Eriksson, "Understanding the Difference Between Software Verification and Validation", 2017, published by ReQTest at https://reqtest.com/testing-blog/software-verification-and-validation-differences/.*

(Continued)

*Primary Examiner* — Hossain M Morshed
(74) *Attorney, Agent, or Firm* — Fish & Richardson P.C.

(57) ABSTRACT

Systems, methods, and software can be used to automate software verifications. In some aspects, one or more application program interface (API) call pairs are generated based on a source code of a user module that invokes an API. Each of the one or more API call pairs comprises a first API call that invokes the API followed by a second API call that invokes the API. One or more fragments are generated based on the one or more API calls pairs. Each of the one or more fragments represents an execution sequence that includes at least one of the one or more API call pairs. The one or more fragments are verified.

14 Claims, 5 Drawing Sheets

(56) References Cited

U.S. PATENT DOCUMENTS

| | | | | |
|---|---|---|---|---|
| 2013/0346302 A1* | 12/2013 | Purves | ................ | G06Q 20/102 |
| | | | | 705/40 |
| 2015/0040108 A1* | 2/2015 | Kushida | .............. | G06F 11/3612 |
| | | | | 717/131 |
| 2016/0267150 A1* | 9/2016 | Gubau i Forne | .... | G06Q 30/018 |
| 2017/0269978 A1* | 9/2017 | Engel | ...................... | G06F 9/541 |
| 2018/0018253 A1* | 1/2018 | Malton | ............... | G06F 11/3604 |

OTHER PUBLICATIONS

Holler, "Fuzzing with Code Fragments", Usenix Security Symposium, 2012 (Year: 2012).*

Extended European Search Report issued in European Application No. 17181480.9 dated Nov. 13, 2017; 7 pages.

Neville et al., "Toward Automated Bounded Model Checking of API Implementations," Jul. 14, 2016; 12 pages; <ftp://SunSITE.Informatik.RWTH-Aachen.DE/pub/publications/CEUR-WS/vol-1639.zip>.

Anonymous, "CEUR Workshop Proceedings (Free, Open-Access Publishing, Computer Science/Information Systems/Information Technology)," Sep. 14, 2017; 2 pages; <CEUR-WS.org>.

Acharya et al., "Mining API Specifications from Source Code for Improving Software Reliability," Dissertation submitted to the Graduate Faculty of North Carolina State University, Raleigh, NC; Apr. 27, 2009; 115 pages; <https://media.proquest.com/media/pq/classic/doc/1760358241/fmt/ai/rep/NPDF?hl=&cit:auth=Acharya,+Mithun+Puthige&cit:title=Mining+API+specifications+from+source+code+for+improving+software+reliability&cit:pub=ProQuest+Dissertations+and+Theses&vol=&cit:iss=&cit:pg=&cit:date=2009&ic=true&cit:prod=P>.

* cited by examiner

```
int *x;
if(non_det())
    x = api_open_overwrite("a.txt");
else
    x = api_open_append("a.txt");
api_write("Blank_file", x);
api_close(x);
```
← 200

FIG. 2

|  | Allowed (union) | Required (intersection) |
|---|---|---|
| Domain | $SA : \mathcal{P}(A)$ | $SR : \mathcal{P}(A)$ |
| Merge | $SA_i := \bigcup_{n=1}^{\infty} SA_{i,n}$ | $SA_i := \bigcap_{n=1}^{\infty} SA_{i,n}$ |
| Transformer | $SA_o := \alpha$ | $SA_o := \alpha$ |

↖ 310

|  | Allowed (union) | Required (intersection) |
|---|---|---|
| Domain | $PA : \mathcal{P}(A)$ | $SR : \mathcal{P}(A)$ |
| Merge | $PA_i := \bigcup_{n=1}^{\infty} PA_{i,n}$ | $PR_i := \bigcap_{n=1}^{\infty} PR_{i,n}$ |
| Transformer | $PA_o := \begin{cases} \alpha \cup PA_i, & \text{if } SA_o \text{ is empty} \\ PA_i, & \text{otherwise} \end{cases}$ | $PR_o := \begin{cases} \alpha \cup PR_i, & \text{if } SR_o \text{ is empty} \\ PR_i, & \text{otherwise} \end{cases}$ |

↖ 320

|  | Allowed (union) | Required (intersection) |
|---|---|---|
| Domain | $PA : \mathcal{P}(A)$ | $SR : \mathcal{P}(A)$ |
| Merge | $PA_i := \bigcup_{n=1}^{\infty} PA_{i,n}$ | $PR_i := \bigcap_{n=1}^{\infty} PR_{i,n}$ |
| Transformer | $PA_o := \begin{cases} \alpha \cup PA_i, & \text{if } SA_o \text{ is empty} \\ PA_i, & \text{otherwise} \end{cases}$ | $PR_o := \begin{cases} \alpha \cup PR_i, & \text{if } SR_o \text{ is empty} \\ PR_i, & \text{otherwise} \end{cases}$ |

AUTOMATION OF SOFTWARE VERIFICATION

CROSS REFERENCE TO RELATED APPLICATIONS

This application claims the benefit of priority of U.S. Application Ser. No. 62/362,978, filed on Jul. 15, 2016, which is incorporated by reference herein in its entirety.

TECHNICAL FIELD

The present disclosure relates to improving the performance of an automated software verification tool.

BACKGROUND

In some cases, software programs can be verified using software verification tools. The software verification tools can be used to check whether the software has bugs. In some implementations, fragments can be generated to approximate the software programs to be verified. A software verification tool can receive fragments as inputs and generate verification results based on the fragments.

DESCRIPTION OF DRAWINGS

FIG. 2 illustrates an example program listing, according to an implementation.

FIG. 3 illustrates an example prefix operation table, an example suffix operation table, and an example pair-wise ordering operation table, according to an implementation.

Like reference numbers and designations in the various drawings indicate like elements.

DETAILED DESCRIPTION

Figure 1:
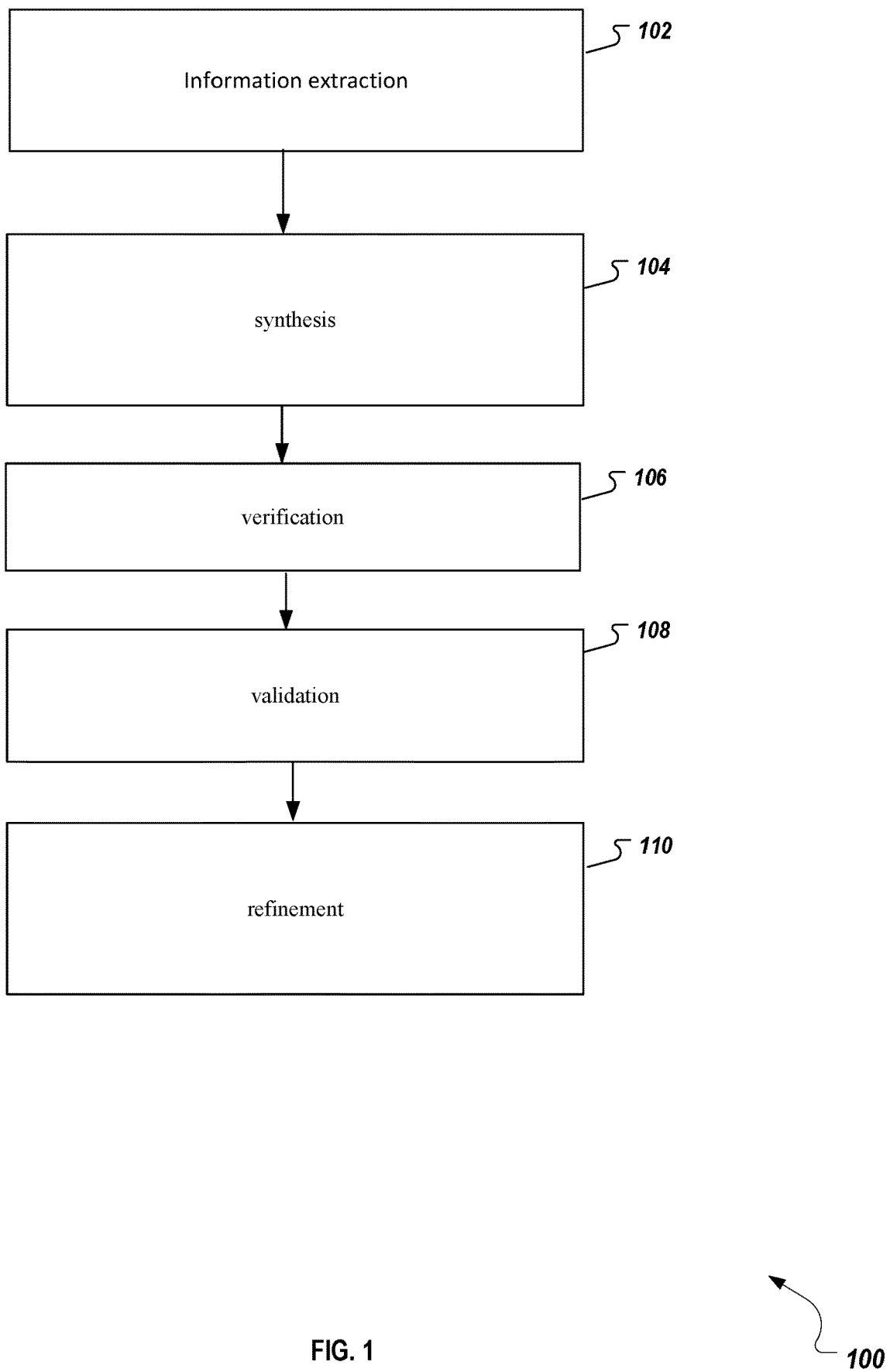
FIG. 1 is a flow diagram showing an example process for verifying software code, according to an implementation.

Applying automated formal methods and bug checking to application program interfaces (APIs) can be a difficult and challenging process. An arbitrary set of API functions has no obvious entrance point, structure, or ordering visible from the raw API code itself, even though the underlying API implementation often uses a specific ordering of API calls to execute.

In some cases, verifiable program fragments can be constructed as inputs to a software verification tool. A fragment can include a sequence of API calls using non-deterministic input that can be verified by a formal methods engine. The underlying usage fragments related to the API implementation can lead to a largely manual approach. However, manual construction of these fragments can be time-consuming, expensive, and more likely to lead to human error.

At a higher level, the fragments can include a sequence of API calls that is realistic, which reflects how a typical end-user would use the API for their development. Bugs that are potentially exploitable in a normal usage pattern of the API can be of more interest than those that require unrealistic or pathological uses of the API. Therefore, realistic calling sequences can be prioritized for verification.

After the construction of a realistic API calling sequence, the variables used within fragments used for the software tests can be instantiated meaningfully, and data structures, such as buffers and pointers, can be initialized correctly. The fragments can also be suitable for verification and constructed in a valid input language for a verification tool.

The size and scope of APIs can make them particularly difficult to test and verify, and corresponding documentation can be complicated. Each API call may take a large number of parameters, each of which may be of variable size. Conventional test suites, which aim to show that an API is free of unwanted behavior, can be limited due to the huge range of possible inputs. For example, if a function has 64-bit long integers as input, each long integer can take as many as $2^{64}$ different values. Therefore a test suite would include $2^{128}$ different tests just to ensure the coverage of a single function, and thus can be unfeasible.

More challengingly, even small APIs may have many permutations. For example, an API can have 10 API calls available, and a tester may wish to choose six API calls for a single test, in some arbitrary order. There are $10!/(10-6)!=151,200$ permutations, which can be too many for manual construction.

Therefore, it is useful to automate the test verification process for APIs against common bugs, e.g., division by zero errors, memory access outside array bounds, dereferencing of invalid pointers, memory leaks and arithmetic overflows, and other errors.

In some cases, C Bounded Model Checker (CBMC) can be used for software verification. CBMC is a software verification tool for C language. CBMC can verify array bounds (including buffer overflows), pointer safety, exceptions and user-specified assertions. For example, a user may assert that two pointers are pointing to different objects: p !=NULL && q !=NULL && p !=q. CBMC has very similar semantics to C. However, APIs have rapid state space expansion arising from the API calling sequences, which in turn leads to a small subset of possible sequences that can be analyzed directly using the CBMC tool.

In some implementations, the verification of an API can be automated by analyzing user modules. In the context of this disclosure, a module is a grouping of software code that has an independent design from other groups of codes. The codes in one module can be reviewed with limited references to codes in other modules. A user module is a module that invokes an API. The user module can include one or more function calls that invoke the API. A model of realistic and typical API usage can be constructed based on one or more user modules that invoke the API. Based on this model, a large number of fragments can be synthesized. These synthesized fragments can be outputted in a C language that can be automatically verified using a formal verification tool that accepts non-deterministic C as input, for example CBMC.

CBMC can be used to automatically analyze the fragments according to a CBMC configuration set by the user, including for example, selection of unwinding limits. If the analysis discovers potential bugs, an error trace can be generated and presented to the user, who assesses whether the error is valid or spurious. The user can further refine the fragments. For example, the user can direct that a derived assumption is to be discarded, modified or, alternatively, add a new assumption of their own. This approach provides more flexible and accurate results.

The synthesis engine can also enable a user to use a test system operating on concrete, tangible data. Support can be added for concretization of common data types. This enables the generation of fully concrete tests for use outside of formal verification.

Techniques that can be used to automate the software program verification process include abstract interpretation and realism spectrum. Abstract interpretation can be used for information extraction. In abstract interpretation, a program can be approximated for verification. In some cases, over and under-approximate conclusions can be drawn without performing all possible calculations. This approach balances the values of correctness and completeness versus computational feasibility.

Realism spectrum refers to considerations in generating verifiable fragments that represent use cases that are likely to be intended by the API developers. For example, a fragment including three consecutive API close routine calls may not be a realistic calling sequence in the real world use. Thus, it may be less important to discover errors for this type of sequence.

The accuracy of a generated program as per its specification can be viewed as a spectrum. On one end of the spectrum lies "complete nondeterminism", where no restriction is placed upon the generated program. This may be unlikely to reflect the API developer's intended use case and hence be a poor use of verification time. On the other end of the spectrum lies "complete determinism", where generated programs must match a known calling sequence with no variation. This may also be a poor approach because only witnessed input programs can be generated, which does not extend the set of verifiable programs available. Somewhere within this spectrum may be the right place for verification, e.g., somewhere near the deterministic end of the spectrum, where programs generated are similar to previously witnessed input while exercising many different, yet realistic calling sequences.

FIG. 1 is a flow diagram showing an example process 100 for verifying software code, according to an implementation. The process 100 can be implemented by one or more computers, or any other systems or modules that verify software code. The example process 100, shown in FIG. 1, can also be implemented using additional, fewer, or different operations, which can be performed in the order shown or in a different order.

The input of the process 100 can include one or more user modules of the API, the API header file, the API source code, a user-provided analysis location within the client code and commands for the verification engine, or any combinations thereof.

The outputs can include a model representing the calling sequence and other extracted data from the user module (for screening or serializing), synthesized verifiable program fragments, bugs found whilst verifying the synthesized fragments, or any combinations thereof.

At 102, information is extracted based on a user module. In this step, underlying usage of the API can be analyzed based on a user module. The calling sequences of the underlying API along with other information, including the reuse of variables and other symbols between API calls, the use of constants within API calls, and how variables may be used within the body of API calls, can be analyzed. Data is extracted using a selection of abstract interpretation techniques. Abstract interpretation is well-suited as exhaustive execution of any input files would likely be computationally unfeasible. It also generates data at multiple locations in the program in addition to the terminal states, although analysis is usually performed by extracting data at the end of the main function. Abstract interpretation enables the rapid static analysis of files and the collection of necessary data in a rapid, user-friendly way.

In some cases, three areas of interest are maintained to determine the calling sequence: prefix, suffix, and pair-wise ordering. In the context of this disclosure, a trace represents an execution sequence of all or a portion of a software program. Prefix refers to the first API call in a given trace, suffix refers to the final API call in a given trace, and pair-wise ordering refers to how API calls are called relative to each other, e.g., open always immediately precedes read. The sets of prefix, suffix, and pair-wise ordering can be calculated automatically over some or all of the traces in the program.

In some cases, merge operations can be used in calculating the sets. Merge operations include intersection and union. In some cases, some or all of the prefix, suffix, and pair-wise ordering sets can be partitioned into a "Required" set and an "Allowed" set. A "Required" set can include the domain that is valid on all traces through a given input. An "Allowed" set can include the domain that is valid on at least one trace through a given input.

The prefix and suffix represent the possible first and last API calls, respectively, in a given program. FIG. 2 illustrates an example program listing 200, according to an implementation. A user module that includes the program listing 200 can have two paths through the program: (1) api_open_overwrite then api_write, api_close; or (2) api_open_append, api_write, api_close. There are two possibly initial API calls: api_open_overwrite or api_open_append. Therefore, the allowed prefix set can be generated based on the union of these two calls, and a required prefix set can be generated based on the intersection of these calls. There is a single suffix call: api_close. Therefore, both the allowed and required suffix sets include this element.

In some cases, a set of operations can be applied automatically during the abstract interpretation to determine the prefix and suffix sets. In some cases, a framework analysis tool, e.g., the CProver Abstract Interpretation framework or other framework analysis tools, using similar semantics, can be used. Each use module can be analyzed to determine its own set of information. For this trace analysis, the program is under-approximated to a set of connected basic blocks, each containing only a sequence of API calls, while other operations are ignored.

For each state calculation, there can be incoming data (prior to transform and merge) and outgoing data (after transform and merge). These sets can be represented as SA, SR, PA, PR, and outgoing data can be represented as X0. When a state has multiple incoming edges, the incoming data for all these edges is represented as $X_{i,n}$. This data is merged to form a single incoming data set ($X_i$) for calculation. States can be initialized as empty.

When an API call is present within an instruction, the transformer is used to calculate the outgoing set, otherwise the outgoing set is a copy of the incoming set. The suffix domain can be calculated independently of other information and is, therefore, calculated first. The prefix domain relies upon information in the suffix domain.

The pair-wise ordering domain is a domain of a set of pairs. Each pair in the set is an ordered pair (x,y). The ordered pair (x,y) represents that an API call x precedes an API call y on at least one trace, without an intermediate API call. For example, the allowed pair-wise set {(api_open; api_write); (api_write; api_close)} indicates that there is at least one trace where api_open precedes api_write and at least one trace (possibly the same) where api_write precedes api_close. Both allowed and required sets can be calculated, using union and intersection accordingly, to generate their data sets. The transformer uses information from the suffix data structure.

FIG. 3 illustrates an example prefix operation table 310, an example suffix operation table 320, and an example pair-wise ordering operation table 330, according to an implementation. For a set of APIs A and a transformer that represents the behavior when reaching an arbitrary API call, the prefix operation table 310 describes the calculation of allowed and required prefix sets; the suffix operation table 320 describes the calculation of allowed and required suffix sets; and the pair-wise ordering operation table 330 describes the calculation of allowed and required ordered pair sets.

A common design pattern is to use a constant value to dictate a mode operator for an API. For example, for an API call: fopen (filename, mode), the second input is a mode operator that indicates access mode for a given file. It is unlikely that an experienced developer would use fopen in an arbitrary manner, so using a completely non-deterministic character for mode is likely to be a poor choice. Instead, it can be initialized non-deterministically to one valid input within its realistic values set. After constant propagation has been applied, the two techniques that can be used for constant extraction include looking over and looking into.

Looking over can be performed over the input files, e.g., the user modules, and identifying where a constant has been used as an argument in an API call. Given a function with x arguments, a table can be generated for all the arguments to track constants. This technique can also be applied to variables. The same variable may be frequently used in multiple API calls in a single calling sequence.

Looking into can be performed by analyzing the API code itself, i.e., within the API bodies. Each API call is instantiated with non-deterministic arguments and constant propagation is applied. When an input argument is compared against a constant value, these values can be extracted (with appropriate semantics) to generate a set of values that direct control flow. This technique results in data being extracted that allows Synthesis in different areas of the Realism Spectrum.

By performing the variable and constant extraction using the looking over or looking into techniques, the state of API calls can be reduced. For example, instead of treating fopen (filename, mode) as one API call in the prefix, suffix, and ordered pair set calculation discussed previously, multiple API calls: fopen_mode1(filename), fopen_mode2(filename), fopen_mode3(filename) can be used to replace each fopen (filename, mode) in a given trace.

Referring back to FIG. 2. at 104, the information extracted, e.g., the prefix set, the suffix set, and the ordered pair set, can be used to synthesize tests for bounded model checking. In some cases, program synthesis tools, e.g., CProver's Goto language framework, can be used to generate fragments based on the extracted information as inputs. The following describes an example implementation for synthesizing the fragments:

1. Configuration initialization and RNG seeding.
2. The main function is added to the synthesized program (SP.)
3. Known API prototypes are added to the SP.
4. Known symbols that will be necessary are added to the SP.
5. A walk is performed over the information extracted from the tests, specifically a walk is performed over the calling sequence information. This adds API calls to the SP. When each API call is added, the assume database is checked to see whether to insert an assume statement prior to API call.
6. The SP is exported as ANSI-C code to file.

The following describes an example implementation for performing the walk operation:

1. An appropriate API function is chosen.
   (a) For the first call: A function that is required (or at least allowed, configuration dependent) to appear first.
   (b) For the last call: A function that is required (or at least allowed, configuration dependent) to appear last.
   (c) For any other call: A function which is required to appear following the previous call (or at least allowed, configuration dependent) or another function dictated by a configuration strategy such as randomization.
2. The API's argument types are extracted and evaluated, including return type.
3. Symbols are selected with appropriate instantiation to support the API call.
4. Instantiated pointers are pointed to appropriate data structures [with necessary recursive instantiation].

Given an arbitrary API call with n arguments and a return value k, appropriate symbols can be used to ensure data is passed through the API calling sequence in a realistic method. Symbol selection supports several different techniques and is configuration dependent.

The following describes an example implementation for symbol selection for an API call α at position k:
   (a) If a suitable constant (string, numeric, etc.) is used at α: k, add this to the consideration list.
   (b) If a suitable variable is used at α: k that has been used previously in an API call, and there is suggestion of such a pattern in the input data: add this to the consideration list.
   (c) If there is an appropriate constant or symbol available: select according to some strategy.
   (d) Otherwise: Declare and instantiate a new variable in a suitably non-deterministic manner (unless full concretization is enabled in configuration).

Figure 4:
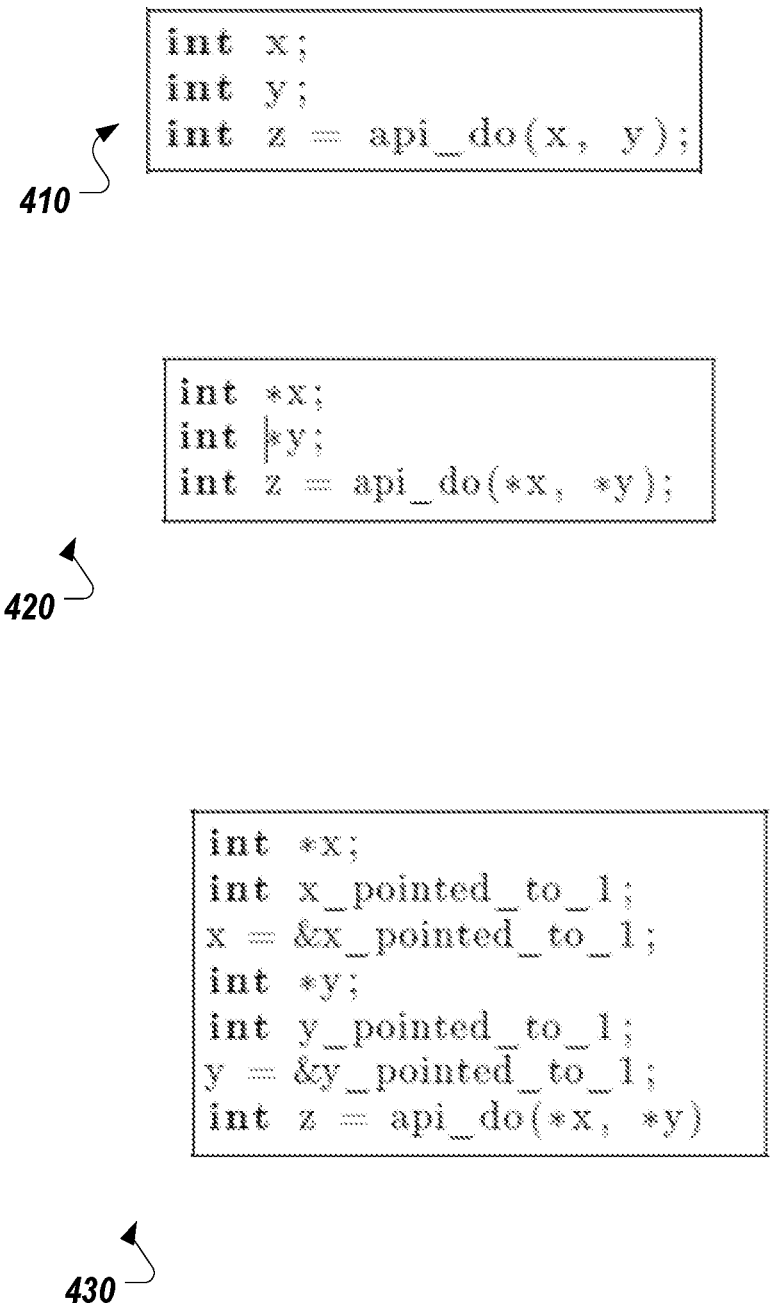
FIG. 4 illustrates example program listings, according to an implementation.

In an instantiation operation, pointers, structs, and other data structures are initialized. If CBMC is used to verify the synthesized programs, it may not be necessary to assign a concrete value to all declared variables. FIG. 4 illustrates example program listings 410, 420, and 430, according to an implementation. For a simple user module such as shown in the program listing 410, CBMC can handle the inherent non-determinism without additional instantiation operation. However, for more complex structures, such as pointers, failing to instantiate can result in trivial errors occurring, such as null pointer exceptions. For example, line 3 of the program listing 420 includes a deference, but CBMC may not assume that the pointers are instantiated correctly, therefore any instrumented pointer assertions will return false. To handle this, all pointers can be instantiated (or left null, as per configuration) before use.

When a new pointer symbol is created for the purpose of being used in an API, a corresponding symbol can be created and instantiated for this new pointer symbol to point, as shown in the program listing 430. This approach enables both variables to be instantiated prior to call. This technique can also be used for pointers to large objects such as buffers.

This technique can also be applied recursively for nonprimitives, where a necessary struct or similar is declared and then each internal primitive is initialized with the technique. A challenge arises when a struct contains a pointer to itself, as this can lead to an infinite initialization loop. This behavior can be handled by modifying the Synthesis Engine's configuration. For example, the Synthesis Engine can be configured to limit the number of structs that are initialized, and remaining pointers are initialized to NULL, safely pointing nowhere.

At 106, the generated fragments can be verified. In one implementation, CProver's CBMC can be used as the verification engine. The generated fragments are compiled into CProver's intermediate reduced instruction-set language (GOTO), and bug checks are instrumented into the program in the form of assertions. CBMC then attempts verification on each program, under the configuration provided by the user.

For each program, if an assertion is violated, then a counterexample trace is generated for validation. The counterexample trace can indicate a sequence of execution steps that violates an assertion. If no assertion is violated, then CBMC can proceed to the next program.

At 108, the verification results can be validated. If a counterexample is found within a fragment, the counterexample can be presented to the user. The user can then inspect the calling sequence that lead to the bug. If the user confirms the bug is genuine, the violated property is identified and the corresponding line of raw source code logged accordingly. The user can then review this later to ensure bugs in the underlying are fixed. Once the user believes they have removed the bug, they can re-run the same synthesized fragment to give a better indication of whether the bug is fixed. The user can then choose to continue verification or stop to fix any bugs found.

If, however, the bug is not genuine, there may be a miscalculation in the underlying API calling model. Therefore, at 110, the model can be refined. To refine the model, the user is provided with the property that was violated, a counterexample that led to the bug, and the underlying assumptions that were generated in the Information Extract stage of the process. The user can, at this point, decide on the next action. They can ignore the error and continue execution. They can abandon execution and find an alternative input, or they can refine the underlying model. The model's constraints can be added to, modified, or deleted. For example, the elements in the prefix set, the suffix set, or the ordered pair set described previously can be modified, added, or deleted. This process can be repeated until the user is satisfied that they have removed the offending incorrect rules. After the user has refined the model, the process can return to 104, where new fragments are generated using the refined model, and analysis continues. In some cases, the underlying principles of the counterexample guided abstraction refinement (CEGAR) can be used during the refinement process.

In one example, the decoder for Brotli, a generic-purpose lossless compression algorithm used for data compression, is used to test the software verification method described herein. The code was large and complex, including 14,000 effective lines of C code, of which 2,000 are contained in C header files. Analysis was performed using an Ubuntu 64-bit virtual machine running in Oracle VM VirtualBox with 8 GB of RAM and with non-dedicated access to two cores of an Intel 4810MQ at 2.80 GHz. Once Brotli had been configured to compile under CBMC, the code was analyzed and a realistic test was generated using components from the Brotli API. This test was executed concretely, producing no bugs or assertion violations. This sample test was then used as input for the Data Extraction Engine and Synthesis Engine, which created multiple fragments that could be used under a verification engine. These were then analyzed using CBMC's signed overflow and bound checks. The CVE vulnerable property was placed under scrutiny. CBMC found a possible arithmetic underflow for the property directly associated with the exploit. The violated assertion corresponds to the patch added by the authors to mitigate this bug.

The performance of information extraction was rapid, even within a virtual machine environment. Step One: Information Extraction was complete within 0.4 s. 1,000 verifiable Brotli fragments can be synthesized from this data in 6 s. The model was refined once to modify an instantiation.

Figure 5:
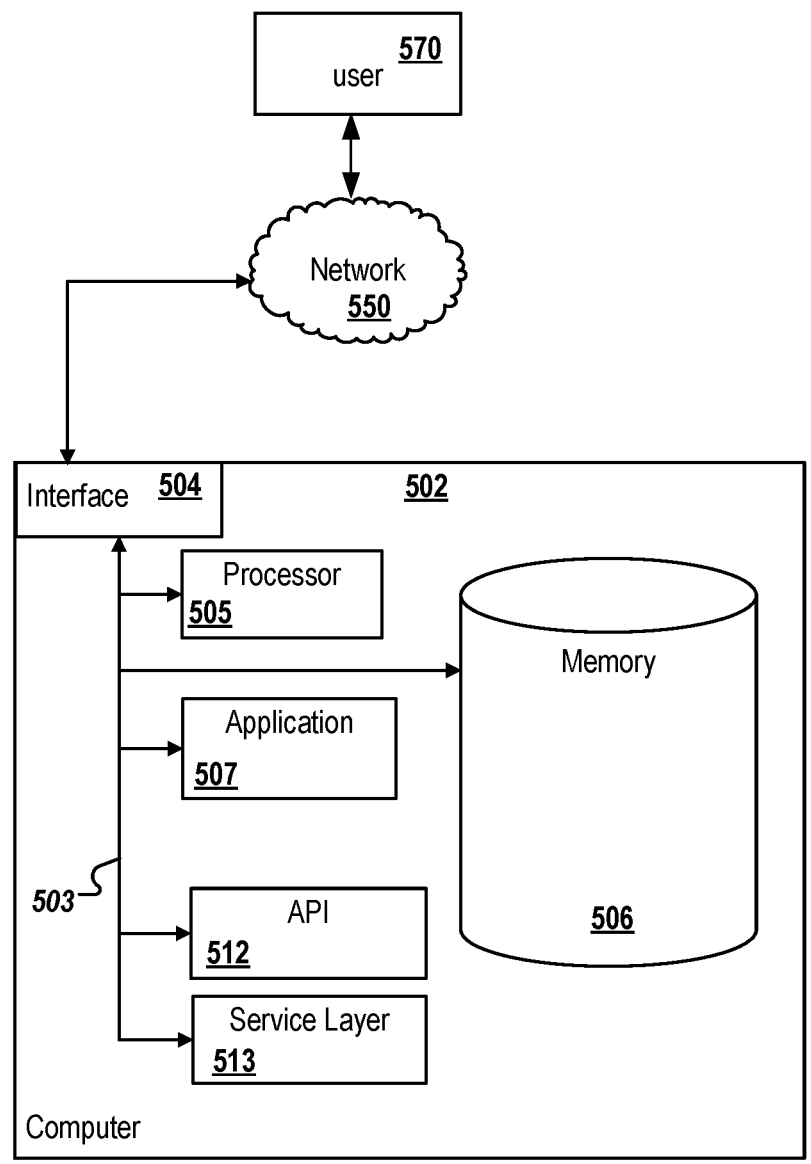
FIG. 5 is a high-level architecture block diagram of a software verification computer, according to an implementation.

FIG. 5 is a high-level architecture block diagram of a software verification computer 502, according to an implementation. The software verification computer 502 is communicably coupled with a user 570 through a network 550. The described illustration is only one possible implementation of the described subject matter and is not intended to limit the disclosure to the single described implementation. Those of ordinary skill in the art will appreciate the fact that the described components can be connected, combined, or used in alternative ways consistent with this disclosure.

The user 570 represents a person, an application, a set of applications, software, software modules, hardware, or combination thereof that can use the software verification computer 502 to verify software code.

The network 550 facilitates communications between the user 570 and the computer 502. In some cases, the user 570 can access the computer 502 from a remote network. In these or other cases, the network 550 can be a wireless or a wireline network. In some cases, the user 570 can access the computer 502 locally. In these or other cases, the network 550 can also be a memory pipe, a hardware connection, or any internal or external communication path between the components.

The computer 502 includes a computing system configured to verify software programs. In some cases, the algorithm can be implemented in an executable computing code, e.g., C/C++ executable codes. Alternatively, or in combination, the algorithm can be implemented in an application program, e.g., EXCEL. In some cases, the computer 502 can include mobile or personal computers that run the application program.

The computer 502 may include an input device, such as a keypad, keyboard, touch screen, microphone, speech recognition device, other device that can accept user information, and/or an output device that conveys information associated with the operation of the computer 502, including digital data, visual and/or audio information, or a GUI.

The computer 502 can serve as a client, network component, a server, a database or other persistency, and/or any other components. In some implementations, one or more components of the computer 502 may be configured to operate within a cloud-computing-based environment.

At a high level, the computer 502 is an electronic computing device operable to receive, transmit, process, store, or manage data and information. According to some implementations, the computer 502 may also include, or be communicably coupled with, an application server, e-mail server, web server, caching server, streaming data server, business intelligence (BI) server, and/or other server.

The computer 502 can receive requests over network 550 from a client application (e.g., executing on another computer 502) and respond to the received requests by processing the said requests in an appropriate software application. In addition, requests may also be sent to the computer 502 from internal users (e.g., from a command console or by another appropriate access method), external or third parties, other automated applications, as well as any other appropriate entities, individuals, systems, or computers.

Each of the components of the computer 502 can communicate using a system bus 503. In some implementations, any and/or all the components of the computer 502, both hardware and/or software, may interface with each other and/or the interface 504 over the system bus 503 using an application programming interface (API) 512 and/or a service layer 513. The API 512 may include specifications for routines, data structures, and object classes. The API 512 may be either computer language-independent or -dependent and refer to a complete interface, a single function, or even a set of APIs. The service layer 513 provides software services to the computer 502 and/or the system 500. The functionality of the computer 502 may be accessible for all service consumers using this service layer. Software services, such as those provided by the service layer 513, provide reusable, defined business functionalities through a defined interface. For example, the interface may be software written in JAVA, C++, or other suitable language providing data in Extensible Markup Language (XML) format or other suitable format. While illustrated as an integrated component of the computer 502, alternative implementations may illustrate the API 512 and/or the service layer 513 as stand-alone components in relation to other components of the computer 502. Moreover, any or all parts of the API 512 and/or the service layer 513 may be implemented as child or sub-modules of another software module, enterprise application, or hardware module, without departing from the scope of this disclosure.

The computer 502 includes an interface 504. Although illustrated as a single interface 504 in FIG. 5, two or more interfaces 504 may be used according to particular needs, desires, or particular implementations of the computer 502. The interface 504 is used by the computer 502 for communicating with other systems in a distributed environment connected to the network 550 (whether illustrated or not). Generally, the interface 504 comprises logic encoded in software and/or hardware in a suitable combination and operable to communicate with the network 550. More specifically, the interface 504 may comprise software supporting one or more communication protocols associated with communications such that the network 550 or interface's hardware is operable to communicate physical signals.

The computer 502 includes a processor 505. Although illustrated as a single processor 505 in FIG. 5, two or more processors may be used according to particular needs, desires, or particular implementations of the computer 502. Generally, the processor 505 executes instructions and manipulates data to perform the operations of the computer 502. Specifically, the processor 505 executes the functionality required for verifying software programs. In some cases, the processor 505 can include a data processing apparatus.

The computer 502 also includes a memory 506 that holds data for the computer 502. Although illustrated as a single memory 506 in FIG. 5, two or more memories may be used according to particular needs, desires, or particular implementations of the computer 502. While memory 506 is illustrated as an integral component of the computer 502, in alternative implementations, memory 506 can be external to the computer 502.

The application 507 is an algorithmic software engine providing functionality according to particular needs, desires, or particular implementations of the computer 502, particularly with respect to functionality required for verifying software programs. Although illustrated as a single application 507, the application 507 may be implemented as multiple applications 507 on the computer 502. In addition, although illustrated as integral to the computer 502, in alternative implementations, the application 507 can be external to the computer 502.

There may be any number of computers associated with, or external to, the computer 502 and communicating over network 550. Further, the terms "client," "user," and other appropriate terminology may be used interchangeably, as appropriate, without departing from the scope of this disclosure. Moreover, this disclosure contemplates that many users may use one computer 502, or that one user may use multiple computers 502.

Figure 6:
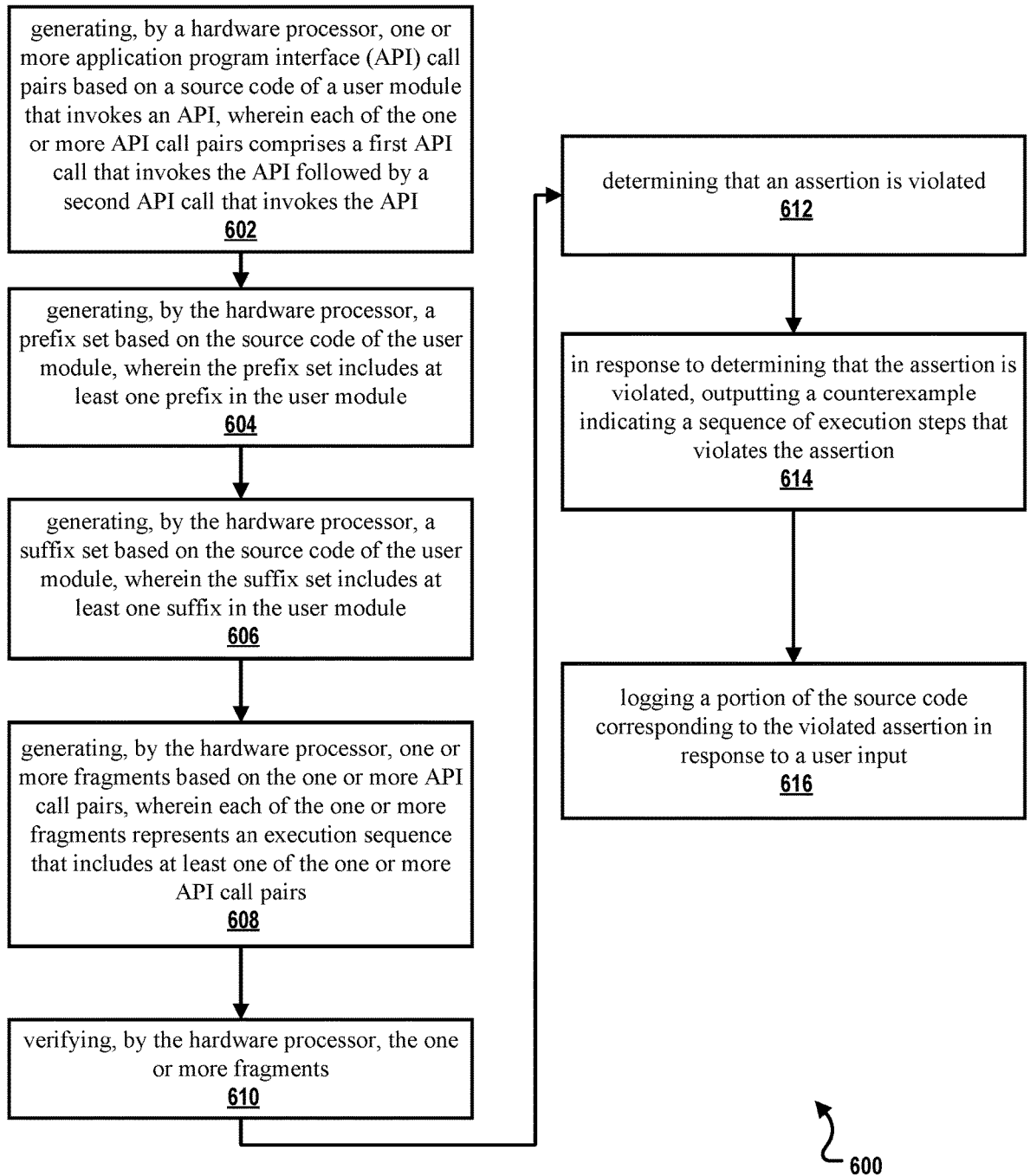
FIG. 6 is a flow diagram showing an example method for automating software verifications, according to an implementation.

FIG. 6 is a flow diagram showing an example method 600 for automating software verifications, according to an implementation. The method 600 can be implemented by one or more software verification computer shown in FIG. 5, or any other systems or modules that verify software. The example method 600, shown in FIG. 6, can also be implemented using additional, fewer, or different operations, which can be performed in the order shown or in a different order.

At 602, one or more application program interface (API) call pairs are generated based on a source code of a user module that invokes an API. Each of the one or more API call pairs comprises a first API call that invokes the API followed by a second API call that invokes the API. In some cases, the one or more API call pairs are generated based on one or more arguments of the first API call or the second API call.

At 604, a prefix set is generated based on the source code of the user module. The prefix set includes at least one prefix in the user module.

At 606, a suffix set is generated based on the source code of the user module. The suffix set includes at least one suffix in the user module.

At 608, one or more fragments are generated based on the one or more API calls pairs. Each of the one or more fragments represents an execution sequence that includes at least one of the one or more API call pairs.

At 610, the one or more fragments are verified. In some cases, the one or more fragments are verified using C Bounded Model Checker (CMBC).

At 612, an assertion is determined to be violated.

At 614, in response to determining that the assertion is violated, counterexample indicating a sequence of execution steps that violates the assertion is outputted.

At 616, a portion of the source code corresponding to the violated assertion is logged in response to a user input.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including, by way of example, a programmable processor, a computer, or multiple processors or computers. The apparatus can also be, or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM), or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media, transitory or non-transitory, suitable for storing computer program instructions and data include all forms of non-volatile memory, media and memory devices, including, by way of example, semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a transitory or non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A method, comprising:
generating, by a hardware processor, one or more application program interface (API) call pairs based on a source code of a user module, wherein each of the one or more API call pairs comprises a first API call that invokes an associated API and a second API call that invokes the same associated API;
generating, by the hardware processor, one or more fragments based on the one or more API call pairs, wherein each of the one or more fragments represents an execution sequence that includes at least one of the one or more API call pairs, the fragments are generated further based on at least one of a prefix set or a suffix set, the prefix set includes at least one prefix in the user module, and the suffix set includes at least one suffix in the user module, and wherein the prefix set comprises an allowed prefix set and a required prefix set, and the suffix set comprises an allowed suffix set and a required suffix set, and wherein the allowed prefix set is obtained based on a union of first API calls of the one or more fragments, the allowed suffix set is obtained based on a union of last API calls of the one or more fragments, the required prefix set is obtained based on an intersection of the first API calls of the one or more fragments, and the required suffix set is obtained based on an intersection of the last API calls of the one or more fragments; and
determining, by the hardware processor, whether an assertion is violated by the one or more fragments.

2. The method of claim 1, wherein the one or more API call pairs are generated based on one or more arguments of the first API call or the second API call.

3. The method of claim 1, wherein whether the assertion is violated by the one or more fragments is determined using C Bounded Model Checker (CBMC).

4. The method of claim 1, further comprising:
in response to determining that the assertion is violated, outputting a counterexample indicating a sequence of execution steps that violates the assertion.

5. The method of claim 4, further comprising: logging a portion of the source code corresponding to the violated assertion in response to a user input.

6. A device, comprising:
at least one hardware processor; and
a non-transitory computer-readable storage medium coupled to the at least one hardware processor and storing programming instructions for execution by the at least one hardware processor, wherein the programming instructions, when executed, cause the at least one hardware processor to perform operations comprising:
generating one or more application program interface (API) call pairs based on a source code of a user module, wherein each of the one or more API call pairs comprises a first API call that invokes an associated API and a second API call that invokes the same associated API;
generating one or more fragments based on the one or more API call pairs, wherein each of the one or more fragments represents an execution sequence that includes at least one of the one or more API call pairs, the fragments are generated further based on at least one of a prefix set or a suffix set, the prefix set includes at least one prefix in the user module, and the suffix set includes at least one suffix in the user module, and wherein the prefix set comprises an allowed prefix set and a required prefix set, and the suffix set comprises an allowed suffix set and a required suffix set, and wherein the allowed prefix set is obtained based on a union of first API calls of the one or more fragments, the allowed suffix set is obtained based on a union of last API calls of the one or more fragments, the required prefix set is obtained based on an intersection of the first API calls of the one or more fragments, and the required suffix set is obtained based on an intersection of the last API calls of the one or more fragments; and
determining whether an assertion is violated by the one or more fragments.

7. The device of claim 6, wherein the one or more API call pairs are generated based on one or more arguments of the first API call or the second API call.

8. The device of claim 6, wherein whether the assertion is violated by the one or more fragments is determined using C Bounded Model Checker (CBMC).

9. The device of claim 6, the operations further comprising:
 in response to determining that the assertion is violated, outputting a counterexample indicating a sequence of execution steps that violates the assertion.

10. The device of claim 9, the operations further comprising: logging a portion of the source code corresponding to the violated assertion in response to a user input.

11. A non-transitory computer-readable medium storing instructions which, when executed, cause a computing device to perform operations comprising:
 generating one or more application program interface (API) call pairs based on a source code of a user module, wherein each of the one or more API call pairs comprises a first API call that invokes an associated API and a second API call that invokes the same associated API;
 generating one or more fragments based on the one or more API call pairs, wherein each of the one or more fragments represents an execution sequence that includes at least one of the one or more API call pairs, the fragments are generated further based on at least one of a prefix set or a suffix set, the prefix set includes at least one prefix in the user module, and the suffix set includes at least one suffix in the user module, and wherein the prefix set comprises an allowed prefix set and a required prefix set, and the suffix set comprises an allowed suffix set and a required suffix set, and wherein the allowed prefix set is obtained based on a union of first API calls of the one or more fragments, the allowed suffix set is obtained based on a union of last API calls of the one or more fragments, the required prefix set is obtained based on an intersection of the first API calls of the one or more fragments, and the required suffix set is obtained based on an intersection of the last API calls of the one or more fragments; and
 determining whether an assertion is violated by the one or more fragments.

12. The non-transitory computer-readable medium of claim 11, wherein the one or more API call pairs are generated based on one or more arguments of the first API call or the second API call.

13. The non-transitory computer-readable medium of claim 11, wherein whether the assertion is violated by the one or more fragments is determined using C Bounded Model Checker (CBMC).

14. The non-transitory computer-readable medium of claim 11, the operations further comprising:
 in response to determining that the assertion is violated, outputting a counterexample indicating a sequence of execution steps that violates the assertion.

* * * * *